Dec. 15, 1970  E. WINTER ET AL  3,546,955
DEVICES FOR TRANSMITTING MOTION IN AN APPARATUS
TO AN ADJUSTABLE INDEX
Filed Nov. 29, 1968

INVENTORS
Ernst Winter
Heinz Riegler
BY Ernst Heo
Lothar Wieland
ATTORNEY

United States Patent Office 3,546,955
Patented Dec. 15, 1970

3,546,955
DEVICES FOR TRANSMITTING MOTION IN AN APPARATUS TO AN ADJUSTABLE INDEX
Ernst Winter, Heinz Riegler, Ernst Leo, and Lothar Wochnik, Gera, Germany, assignors to VEB Carl Zeiss Jena, Jena, Gera, Germany
Filed Nov. 29, 1968, Ser. No. 780,946
Int. Cl. F16h 27/02, 35/18
U.S. Cl. 74—89.22
1 Claim

ABSTRACT OF THE DISCLOSURE

A mechanical transmitter conveys motion in a measuring apparatus to an index by means of two oppositely directed cables. Each of these cables is secured to both the transmitter and the index, or the carrier of this index, and runs over, and is kept taut by, at least one elastically mounted pulley. One of the pulleys of each cable is mounted on a lever. The axes of rotation of these two levers extend parallel to the axes of the pulleys, and the two levers are linked to each other by a connecting piece. The linkage points of the connecting piece on the two levers are at such distances from the fulcrums of the levers as to prevent that changes in temperature and, accordingly, in the lengths of the cables cause undesired motion of the index.

---

This invention is concerned with a device for transmitting motion in an apparatus, particularly in measuring instruments, to an adjustable index connected to the apparatus by two oppositely directed cables each of which runs over, and is kept taut by, at least one guide pulley. The device is applicable for example in measuring instruments in which an indexing mark or a recording stylus are required to operate in constant relationship to the rotation of a shaft.

In devices of the foregoing kind, the pulleys and cables are held in contact with one another by means of one or more springs or, alternatively, by means of a system of weights. Where springs are used, changes in the lengths of the cables, depending on the material employed and due to aging, temperature or humidity, are compensated by these springs, provided that both cables are of the same material and the same length and that the springs associated with the one cable have the same coefficient of elasticity as those associated with the other cable. Neglect of these conditions may cause displacement of the index without respective motion in the apparatus.

Apart from the difficulty of having springs of exactly identical coefficients of elasticity at disposal for both cables, the action of the springs will be disturbed if they are made to aid the cables in connecting the index to the apparatus and in that capacity come to lie against the pulleys when motion is being transmitted. Moreover, permanence and equality of the lengths of the cables is very often impaired by constructional limitations, so that the springs are useless in avoiding misadjustment of the index due to differences in cable length.

It is an object of the present invention to obviate these disadvantages by providing a device for transmitting the motion of an apparatus to an adjustable index, wherein the means for compensating changes in the lengths of the cables are no springs and the function of these means is independent of whether the cables are equal in length or not.

Thus, according to the present invention, there is provided a device for transmitting the motion of an apparatus to an adjustable index, wherein the levers carrying the pulleys are linked to each other by a connecting piece and wherein the distances of the linkage points of the connecting piece from the fulcrums of the levers are in inverse ratio to the lengths of the cables.

Accordingly, there exists inverse proportionality between the lengths of the cables and the distances of the linkage points of the connecting piece from the fulcrums of the levers, so that the distances of the axes of rotation of the pulleys from these fulcrums are equal to each other.

In another embodiment of the invention, the levers carrying the pulleys are likewise linked to each other by a connecting piece, but the distances of the axes of rotation of the pulleys from the fulcrums of the levers have the same relationship to each other as have the lengths of the cables, so that the distances of the linkage points of the connecting piece from the fulcrums are equal to each other. Equality either between the distances of the axes of rotation of the pulleys from the fulcrums of the levers or between the distances of the linkage points of the connecting piece from these fulcrums, can be dispensed with if these distances are in such relationship to each other that changes in the lengths of the cables are compensated by deviations of the pulleys due to operation of the levers.

The index is either a pointer working against a scale, or a recording stylus. The part of the apparatus which supplies the motion may move either linearly or in a circle. It may be for example a cable drum.

In order that the invention may be more readily understood, reference is made to the accompanying drawing which illustrates diagrammatically and by way of example two embodiments thereof, and in which.

Figure 1:
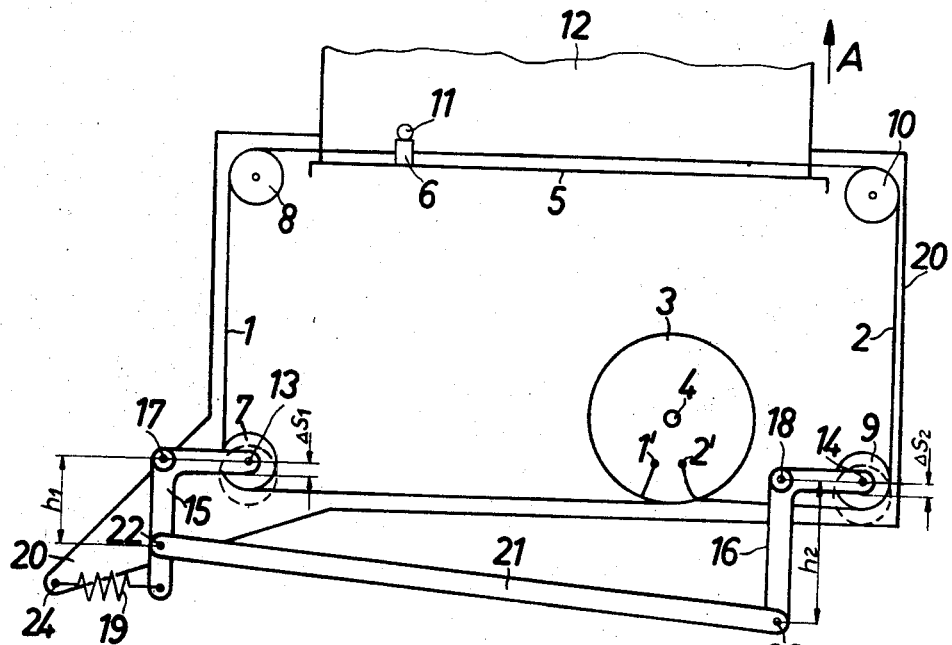
FIG. 1 shows the one embodiment, with cables of unequal lengths.

In FIG. 1 of the drawing, the one ends of two cables 1 and 2 of the same material but of unequal lengths are respectively secured at points 1' and 2' to a cable drum 3. The drum 3 is keyed to a shaft 4 which is mounted on a base plate 20 and rotates at right angles to the plane of the drawing. The other ends of the cables 1 and 2 are secured to a slide 6 displaceable along a stationary guide 5. The cables 1 and 2 are respectively guided by pulleys 7, 8 and 9, 10. As the slide 6 shown in the drawing is located near the left end of the guide 5, the longer cable 1 forms a loop round the drum 3, whereas the shorter cable 2 just contacts the periphery of this drum. A recording stylus 11 held by the slide 6 is displaceable at right angles to the displacement of a recording sheet 12 in the direction of arrow A. The pulley 7 is mounted on one arm of a toggle lever 15 for rotation about an axle 13. The pulley 9 is mounted on the one arm of a toggle lever 16 for rotation about an axle 14. The axles 13 and 14 are at right angles to the plane of the drawing, and the levers 15 and 16 are respectively rotatable about stationary fulcrums 17 and 18 parallel to the axles 13 and 14. The two ends of a coil spring 19 are respectively secured to the free end of the lever 15 and a pin 24 fast with the base plate 20, the springs 19 pulling the free end of the lever 15 towards the pin 24. The guide pulleys 9 and 10 as well as the levers 15 and 16 are mounted on the base plate 20. The two ends of a connecting rod 21 are respectively linked at a point 22 to the free end of the lever 15 and at a point 23 to the free end of the lever 16, so that the rod 21 transmits the force of the spring 19 from the lever 15 to the lever 16.

The rotation of the drum 3 is transformed by the cables 1 and 2 and the pulleys 30 and 31 into linear motion of the slide 6 and stylus 11. Clockwise rotation of the shaft 4 displaces the slide 6 towards the right; counter-clockwise rotation, towards the left. Assuming the spring rate to be linear within the range of interest, the spring 19 in cooperation with the levers 15, 16, the rod 21 and the pulleys 7, 9 will keep the cables 1 and 2 under the tension desired.

Subject to sameness of material in the cables 1 and 2, influences of aging, temperature and humidity will affect these unequally long cables differently, working out for example in the sense of elongations. If the spring 19 were to influence the pulleys 7 and 9 in one and the same manner, the differentiated elongations of the cables 1 and 2 would balance each other by displacing the slide 6 without rotation on the part of the drum 3. However, the distance $h_1$ of the linkage point 22 of the rod 21 from the fulcrum 17 of the lever 15 is smaller than the distance $h_2$ of the linkage point 23 of the rod 21 from the fulcrum 18 of the lever 16. The distance of the axle 13 from the fulcrum 17 and that of the axle 14 from the fulcrum 18 are equal to each other. Accordingly, a definite rotation of the lever 15 corresponds to a smaller rotation of the lever 16, and the deflection $\Delta s_1$ of the pulley 7 into its broken-line position is greater than the respective deflection $\Delta s_2$ of the pulley 9. These deflections, different from one another, correspond accurately to the different changes in the lengths of the cables. The spring 19 acts on the cables 1 and 2 with the same force. In spite of the different elongations of the cables, there is no change in the position of the slide 6 and stylus 11 relative to the recording sheet 12. The cable lengths $s_1$ and $s_2$, the distances $h_1$ and $h_2$ and the deflections (changes in cable lengths) $\Delta s_1$ and $\Delta s_2$ have to each other the relationship $s_1:s_2=h_2:h_1=\Delta s_1:\Delta s_2$.

Alternatively to the cable drum 3 and the shaft 4, use can be made of a slide for translatory motion, for example as shown in German utility Pat. No. 1,726,545.

Figure 2:
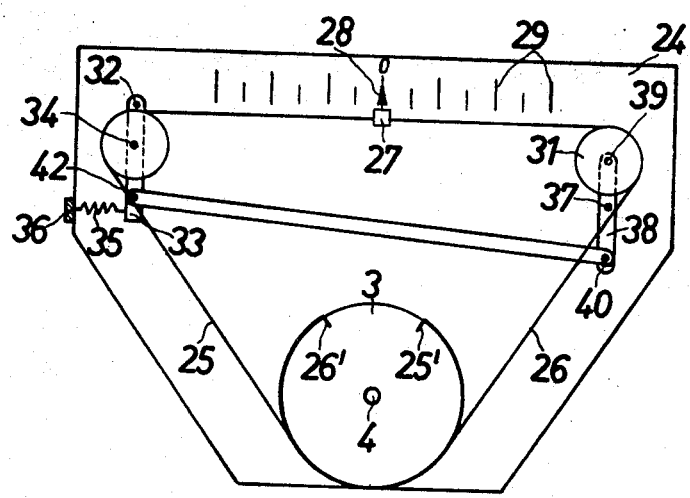
FIG. 2 shows the other embodiment, with cables of equal lengths.

The embodiment shown in FIG. 2 of the drawing also comprises a cable drum 3 keyed to a shaft 4. Two cables 25 and 26 of equal length and of the same material are secured at their one ends to the drum 3 at points 25' and 26', respectively, while their other ends are fast with a carrier 27 of an index 28, which is displaceable along a guide (not shown) parallel to a stationary scale 29. The cables 25 and 26 are in part wound around the drum 3 and are guided over pulleys 30 and 31, respectively. The pulley 30 is rotatable about an axle 34 fast with a lever 33. The lever 33 rotates about a fulcrum 32 and by means of a coil spring 35 is pulled towards a lug 36 on a base plate 24. A two-arm lever 38 is rotatable about a fulcrum 37. The one end of the lever 38 carries the pulley 31, which rotates about an axle 39. The other end of the lever 38 is linked at a point 40 to the one end of a connecting rod 41. The other end of the connecting rod 41 is linked at a point 42 to the lever 33. The fulcrums 32 and 37 of, respectively, the levers 33 and 38 are fast with the base plate 24.

The rotation of the shaft 4 and drum 3 is transformed by the cables 25 and 26 and the pulleys 30 and 31 into linear motion of the carrier 27 and index 28 for measurement along the scale 29. The cable lengths being equal, the distances of the axles 34 and 39 from the fulcrums 32 and 37 as well as the distances of the linkage points 42 and 40 from these fulcrums are also equal. In the event of a change in the lengths of the two cables 25 and 26, the spring 35 acts on both cables with one and the same force, since the material and the lengths of the cables and, accordingly, changes in these lengths are the same. Thus, the index 28 can be displaced only in consequence of rotations of the drum 3. The rotations of the levers 33 and 38 deviate the carrier 27 and index 28 only slightly in a sense transverse to the scale 29, which will not however detract from the accuracy of the indication or reading.

The embodiments of the invention particularly described are presented merely as examples of how the invention may be applied; other embodiments, forms and modifications of the invention coming within the proper scope of the appended claims will of course readily suggest themselves to those skilled in the art. It is possible for example to alter the number and positions of the pulleys and to locate the fulcrums, axles and linkage points at other places.

We claim:

1. A device for transmitting motion in a measuring apparatus with due allowance for the temperature dependence of the transmitting means comprising:

a base plate,
on said base plate being mounted
a displaceable mechanical transmitter,
an adjustable index,
two cables extending in substantially opposite directions from said transmitter to said index for conveying motion from said transmitter to said index,
    the one ends of said cables being connected to said transmitter an dthe other ends of said cables being connected to said index,
at least two guide pulleys rotatable about axes at right angles to said base plate,
    each of said cables running over at least one of said pulleys,
two levers mounted for rotation parallel to said base plate,
    each of said levers being conjugate to one of said cables and carrying one of said pulleys,
a connecting piece linked to both said levers,
and a spring for causing said plleys to keep the cables taut,
    the distances of the linkage points of said connecting piece on said levers from the fulcrums of said levers being such that temperature dependent changes in the lengths of said cables produce corresponding displacements of said pulleys parallel to said base plate.

References Cited

UNITED STATES PATENTS

| | | | |
|---|---|---|---|
| 2,027,275 | 1/1936 | Foster | 74—89.22 |
| 2,491,341 | 12/1949 | Tillman | 74—89.22 |
| 2,884,788 | 5/1959 | Clark | 74—89.22 |
| 3,011,034 | 11/1961 | Laviana | 74—89.22 |
| 3,194,080 | 7/1965 | Olson | 74—10.7 |
| 3,262,330 | 7/1966 | Cheatum | 74—242.11 |

FRED C. MATTERN, Jr., Primary Examiner

W. S. RATLIFF, Jr., Assistant Examiner

U.S. Cl. X.R.

74—10.7